US009654407B2

(12) United States Patent
Levy

(10) Patent No.: US 9,654,407 B2
(45) Date of Patent: May 16, 2017

(54) COMMUNICATION SYSTEMS AND METHODS HAVING REDUCED FRAME DURATION

(71) Applicant: Infineon Technologies AG, Neubiberg (DE)

(72) Inventor: David Levy, Wernberg (AT)

(73) Assignee: Infineon Technologies AG, Neubiberg (DE)

( * ) Notice: Subject to any disclaimer, the term of this patent is extended or adjusted under 35 U.S.C. 154(b) by 172 days.

(21) Appl. No.: 14/587,089

(22) Filed: Dec. 31, 2014

(65) Prior Publication Data

US 2016/0191401 A1 Jun. 30, 2016

(51) Int. Cl.
*H04L 12/26* (2006.01)
*H04J 3/07* (2006.01)
*H04L 12/805* (2013.01)

(52) U.S. Cl.
CPC .................. *H04L 47/365* (2013.01)

(58) Field of Classification Search
CPC ...... H04L 1/0007; H04L 47/10; H04L 1/0072
See application file for complete search history.

(56) References Cited

U.S. PATENT DOCUMENTS

| | | | |
|---|---|---|---|
| 5,281,965 A | 1/1994 | Hoekman et al. | |
| 6,859,465 B1* | 2/2005 | Colban | H04L 25/03866 370/506 |
| 7,411,983 B2 | 8/2008 | Jo et al. | |
| 7,454,494 B1* | 11/2008 | Hedayat | H04L 12/2697 370/244 |
| 2008/0095168 A1* | 4/2008 | Frazier | H04L 1/0007 370/394 |
| 2009/0235041 A1* | 9/2009 | Harris | G06F 3/0613 711/170 |
| 2010/0165955 A1* | 7/2010 | Park | H04W 28/16 370/337 |
| 2011/0013639 A1* | 1/2011 | Matthews | H04L 45/00 370/395.32 |
| 2012/0230370 A1* | 9/2012 | Shaffer | H04B 1/713 375/133 |
| 2012/0237036 A1* | 9/2012 | Dabak | H05K 5/0278 380/287 |
| 2013/0156018 A1* | 6/2013 | Kim | H04W 56/003 370/338 |
| 2013/0173989 A1* | 7/2013 | Chung | G11C 7/1006 714/763 |
| 2013/0336320 A1* | 12/2013 | Rangaraman | H04L 45/38 370/392 |
| 2015/0326603 A1* | 11/2015 | Deisinger | H04L 69/166 726/22 |

* cited by examiner

*Primary Examiner* — Melanie Jagannathan
(74) *Attorney, Agent, or Firm* — Eschweiler & Potashnik, LLC

(57) ABSTRACT

A transmitter arrangement using randomization is disclosed. The arrangement includes one or more randomizers, a measure component and a frame select component. The one or more randomizers are configured to generate one or more randomized frames from an original frame. The measure component is configured to measure a criterion for the original frame and the one or more randomized frames. The frame select component is configured to select a frame for transmission from the one or more randomized frames and the original frame. The selection is performed according to the measured criteria, such as frame duration.

12 Claims, 5 Drawing Sheets

COMMUNICATION SYSTEMS AND METHODS HAVING REDUCED FRAME DURATION

BACKGROUND

Communication protocols are used to facilitate communications between components and devices. The communication protocols provide a standardized way for the transfer of information.

Typically, the protocols utilize frames to transfer the data and each frame requires a period of time to be transferred, which is referred to as the frame duration. The frames can vary in duration according to the data provided in the frames and the protocol being used. Thus, some frames have a relatively long or large duration while others have a shorter duration. Unfortunately, the system must assume the worst case scenario and use the maximum frame duration for communications. This lowers throughput and generally degrades communications.

What is needed is a technique to reduce frame duration and increase communications throughput.

DETAILED DESCRIPTION

Figure 1:
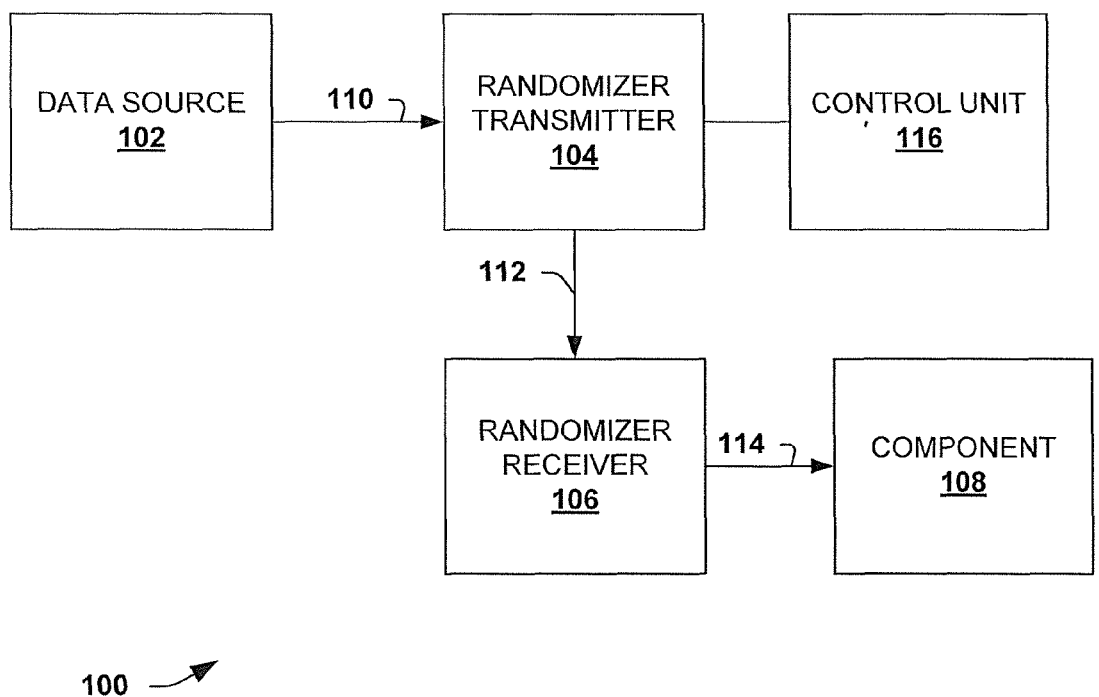
FIG. 1 is a diagram illustrating a system that mitigates frame duration using randomization.

The systems and methods of this disclosure are described with reference to the attached drawing figures, wherein like reference numerals are used to refer to like elements throughout, and wherein the illustrated structures and devices are not necessarily drawn to scale.

FIG. 1 is a diagram illustrating a system 100 that mitigates frame duration using randomization. Randomization is used to scramble/randomize a frame using one or more seed values. Then, the scrambled frames are compared with the original frame with regard to duration and the shortest frame is used for communication. The system 100 can also be considered an arrangement of the described components and variations can include additional components and/or omit one or more of the included components.

The time period for a given frame to be sent is referred to as its duration or frame duration. For various protocols, such as short pulse width modulation code (SPC) and single edge nibble (SENT), frame duration is a function of the data content of the frame. In one example, the duration of a frame in unit time (UT) is given by:

$$t(UT) = 56 + \Sigma_{i=1}^{n}(12+d_i)$$

Thus, the frame has a fixed portion (56) and a variable portion. For this example, the frame has a frame duration with a minimum of 188 micro seconds and maximum of 353 micro seconds, where n (number of nibbles) is at 11 and one unit time is 1 μs. If a worst case scenario is assumed, other systems would assume the maximum of 353 micro seconds for all frames, thereby limiting throughput. The variable portion depends on the number of nibbles and the content of the nibbles. A nibble is 4 bits. Thus, a nibble of "1111" results in a longer duration than the same nibble of "0000". The duration of the "0000" nibble is 12UT, while the duration of the "1111" nibble is 27UT (=12+15).

The system 100 includes a data source 102, a randomizer transmitter 104, a derandomizer receiver 106, a component 108 and a control unit 116. The system 100 mitigates frame durations in order to increase throughput and improve communications. The data source 102 provides an original frame of data 110 having a fixed length or size. The frame 110 follows a protocol, such as the SPC or SENT, and has a header, a fixed data portion and a variable data portion. The data portions, in one example, are organized in nibbles, which are 4 bits of data.

The randomizer transmitter 104 receives the frame 110 and generates one or more scrambled/randomized frames using pseudo-randomization and seeds, where one seed is used per scrambled frame. Thus, a plurality of seeds are used to generate the one or more randmomized/scrambled frames. The randomized frames can include non-randomized portions, such as to include header information, such as sync information, seed indexes, and the like.

A variety of scramblers/randomizers and types can be used to generate the one or more randomized/scrambled frames. One technique involves randomly selecting bits of a data portion of the frame 110 to invert. As an example, an additive scrambler/randomizer can be used that transforms the data portion of the frame 110 by applying a pseudo-random binary sequence (PRBS). A linear feedback shift register can be used to transform the frame 110. As another example, a multiplicative scrambler/randomizer can be used. The multiplicative randomizer performs a multiplication of the frame 110 by a transfer function in Z-space. It is appreciated that other suitable randomization techniques can be used.

The control unit 116 is configured to select or generate the seeds used to generate the randomized frames. Additionally, the control unit 116 is configured to select or develop the randomization techniques used. This can be performed during normal use or in development or initialization. For example, the control unit 116 can be configured to select seeds that are more likely to result in shorter frame durations. Similarly, the control unit 116 can be configured to select randomization/scrambling techniques likely to result in shorter frame durations. Additionally, the control unit 116 can be configured to select the number of the plurality of seeds used and randomized frames generated. The more frames that are used, the more bits required to identify the seed used to generate the randomized frame, which can increase frame duration. In one example, two bits are used to index for 3 seeds and 3 generated randomized frames. In another example, a nibble of 4 bits is used to index for 15 seeds and 15 generated randomized frames. It is appreciated that other suitable numbers of seeds and/or randomized frames can be used.

The randomizer transmitter 104 determines and compares the durations of the scrambled frames and the original frame 110 and generally selects the frame with the shortest frame duration. It is possible that the original frame 110 comes out to have the shortest duration. The selected frame 112 is sent by the transmitter 104. A seed indicating which, if any, of the one or more randomizers used is pre-pended or otherwise attached to the selected frame 112. In one example, a nibble of the data portions is used for the seed index and is not randomized or altered.

Although the selection criterion of frame duration is shown, it is appreciated that other selection techniques or criteria can be used. For example, current consumption (for DSI3), numbers of transitions (for PSI5), and the like can also be used as selection criteria. Additionally, it is appreciated that multiple criteria can be used as a selection technique.

The derandomizer receiver 106 obtains the selected frame 112 using a suitable technique. The derandomizer receiver 106 is configured to identify the seed used and descramble the selected frame. In one example, the receiver 106 is configured to identify the seed by identifying an unrandomized nibble of the frame 112 and extracting the nibble to obtain the seed index. The derandomizer receiver 106 includes one or more derandomizers to perform the descrambling. The one or more derandomizers correspond to the one or more randomizers of the randomizer transmitter 104. Thus, for example, additive derandomizers can be used to descramble the frame 112.

The derandomizer receiver 106 analyzes the frame 112 to identify the seed used, if any, to scramble the frame 112. In one approach, the seed indicates which derandomizer to use and the indicated derandomizer is used to descramble the frame 112. In another approach, all of the one or more derandomizers generate one or more descrambled frames and the seed indicates which one of the descrambled frames to use. Variations of these approaches can also be used.

Thus, the derandomizer receiver 106 is configured to generate a descrambled or derandomized frame 114 using one of the above approaches and the seed. The descrambled frame 114 is substantially identical to the original frame 110. The descrambled frame 114 is provided to the component 108, which obtains and/or uses the fixed and variable data contained therein.

The system 100 can continue operation with additional data frames, used sequentially as the original frame 110. On average, the frames using the randomizer transmitter 104 tend to have a smaller duration and increase throughput.

Figure 2:
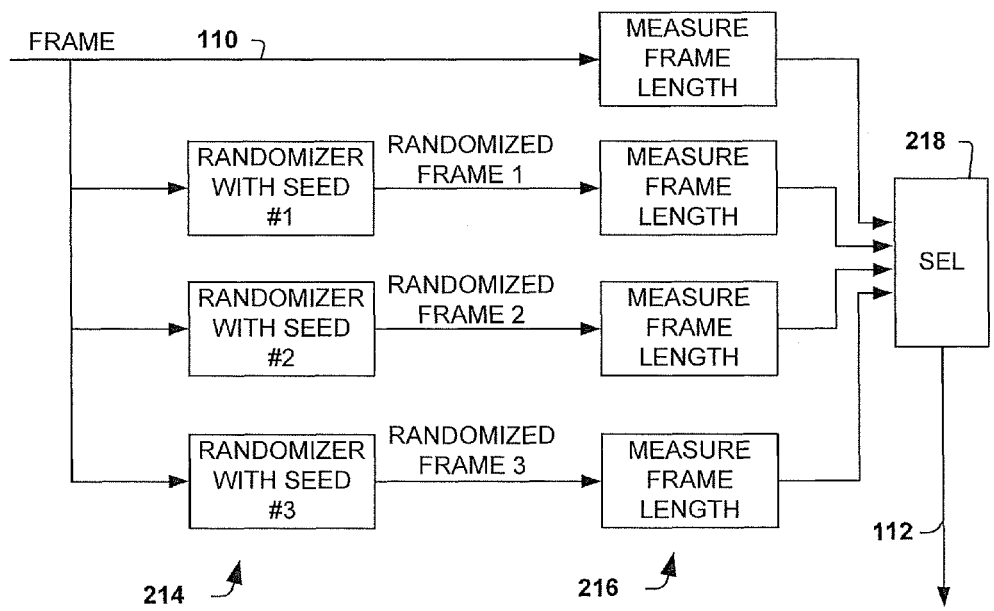
FIG. 2 is a diagram illustrating a randomizer transmitter that mitigates average frame duration.

FIG. 2 is a diagram illustrating a randomizer transmitter 200 that mitigates average frame duration. The randomizer transmitter 200 receives a frame and generates a frame for transmission that mitigates frame duration. The transmitter 200 can be used in the system 100 above as the randomizer transmitter 104 and/or other communication systems.

The randomizer transmitter 200 includes a plurality of randomizers 214, a plurality of measuring components 216 and a frame select component 218. An original frame 110 is received by the transmitter 200. The original frame 110 is also received by the plurality of randomizers and a first of the measuring components 216.

The plurality of randomizers 214 scramble or randomize the original frame to generate a plurality of randomized frames. Each of the randomizers uses a unique seed for performing the randomization. Thus, the generated randomized frames are typically varied in content and may be varied in duration. Some examples of suitable techniques are described above.

A suitable randomization or scrambling technique is used, such as pseudo-randomization. One technique involves randomly selecting bits of a data portion of the frame 110 to invert, where the selected bits depend on the seed. As another example, an additive randomizer can be used that transforms the data portion of the frame 110 by applying a pseudo-random binary sequence (PRBS). The randomizers 214 can incorporate a linear feedback shift register can be used to transform the frame 110. As another example, a multiplicative randomizer can be used. The multiplicative randomizer performs a multiplication of the frame 110 by a transfer function in Z-space. It is appreciated that other suitable randomization techniques can be used.

In this example, a first randomizer of the plurality of randomizers 214 generates a first randomized frame using a first seed. A second randomizer generates a second randomized frame using a second seed and a third randomizer generates a third randomized frame using a third seed.

The measuring components 216 measure a duration of the original frame and the randomized frames. The duration can be determined by analyzing the frames to calculate the duration in unit time (UT) for each frame. The frames along the durations are provided to the select component 218.

The measuring components 216 are described as measuring duration, however other criteria can be measured in addition to or instead of the duration. For example, current consumption, emissions, transitions and the like can be measured.

The frame select component 218 selects one of the frames for transmission and attaches a seed index to the selected frame 112 to indicate which seed was used. For example, two bits can be attached to the selected frame to designate the randomization used, such as to designate the original frame 110 as '00', the first randomized frame using the first seed as '01', the second randomized frame using the second seed as '10' and the third randomized frame using the third seed as '11'.

Figure 3:
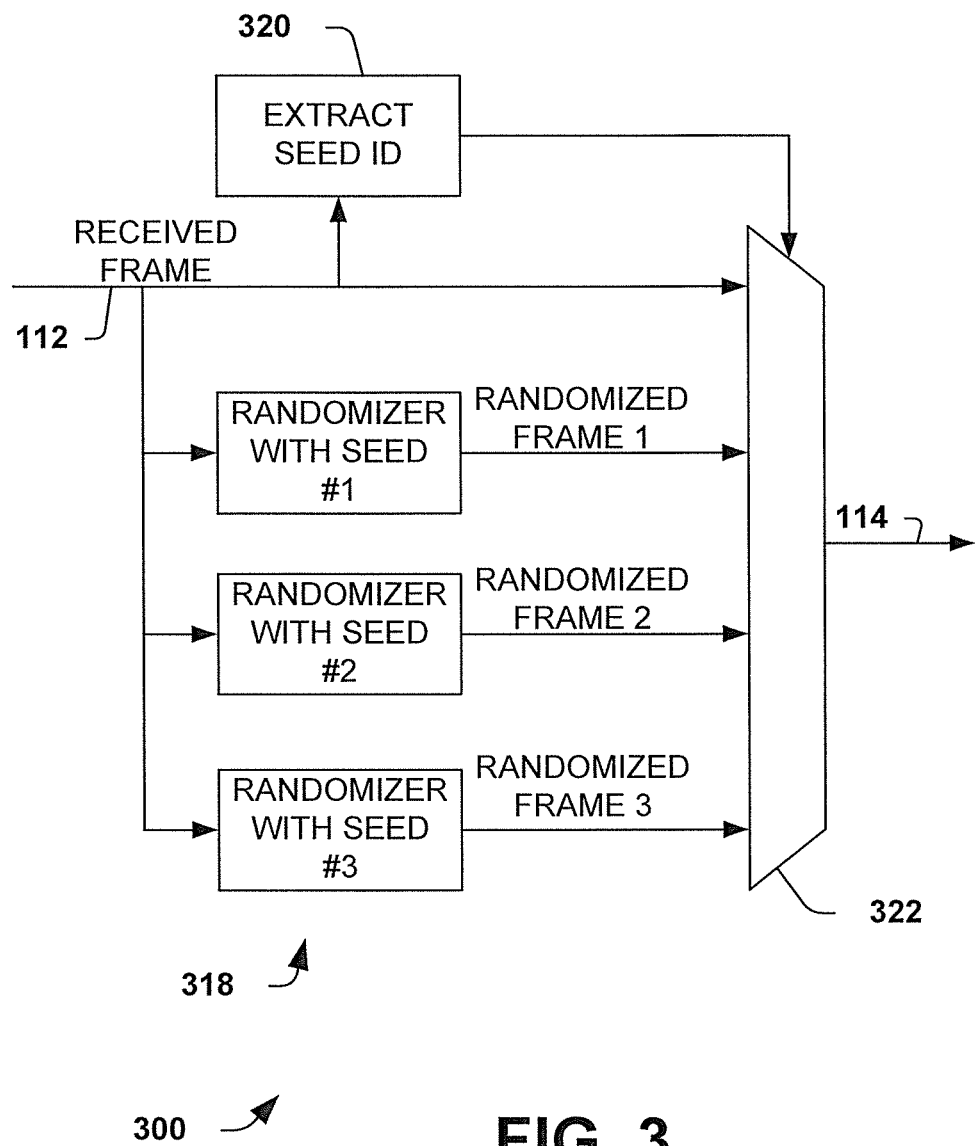
FIG. 3 is a diagram illustrating a derandomizer receiver that handles randomized frames.

FIG. 3 is a diagram illustrating a derandomizer receiver 300 that handles randomized frames. The receiver 300 can be used, for example, as the derandomizer receiver 106 in the system 100, described above. The derandomizer receiver 300 analyzes a received frame that may be randomized and derives an output frame that substantially includes an original frame.

The derandomizer receiver 300 includes a seed extractor 320, a plurality of derandomizers 318 and a frame selector 322. The receiver 300 receives the received frame 112 from the transmitter 200. The seed extractor 320 extracts a seed identification or index from the received frame 112. In one example, the seed index is obtained based on a selected number of bits assigned to the seed index. The seed extractor 320 outputs the seed index to the frame selector 322.

The plurality of derandomizers 318 are assigned seed values that correspond to the plurality of randomizers 214, described above. The derandomizers 318 perform the opposite operation, referred to as descrambling or unrandomizing. As a result, a first derandomizer of the plurality 318 generates a first unrandomized frame using the first seed. A second derandomizer generates a second unrandomized frame using the second seed. A third derandomizer generates a third unrandomized frame using the third seed.

The frame selector 322 receives the received frame 112, the first unrandomized frame, the second unrandomized frame and the third unrandomized frame and passes one of the frames as an output frame 114 based on the seed index. In one example, if the seed index is '00', the received frame 112 is passed, if the seed index is '01' the first unrandomized frame is passed, if the seed index is '10' the second unrandomized frame is passed, and if the seed index is '11' the third unrandomized frame is passed as the output frame 114.

The output frame 114 is substantially the same as the original frame 110. The output frame 114, including the fixed length and varied length data, can then be used by other components.

It is appreciated that variations of the receiver 300 are contemplated. For example, a single derandomizer could be used with a seed that varies according to the seed index.

Figure 4:
FIG. 4 is a diagram illustrating an example frame for transmission.

FIG. 4 is a diagram illustrating an example frame 400 for transmission. The frame 400 could be used for the frame 112, described above. It is appreciated that the frame 400 is an example and that variations and other forms of frames can be also be used.

The frame 400 is shown with a plurality of header fields including a sync field, seed index/ID, and status and data fields. It is appreciated that variations in the fields, lengths of the fields, omission of some of the fields, and/or other fields can be present in the frame 400.

The sync field has a duration, such as a duration of 56 UT in one example, and is used to synchronize the transmitter and receiver. The seed index is a field that identifies which seed of a plurality of seeds was used to randomize. For example, a seed index of 0 could correspond to no randomization, a seed index of 1—a first seed, a seed index of 2—a second seed, and a seed index of 3—a third seed. Generally, the seed index has sufficient bits to convey the seed index used. The status field is a field that has one or more bits and is used to indicate a status of the frame.

The data fields include a plurality of nibbles. In this example, the data fields are designated DATA 0, DATA 1, . . . to DATA N, where N is the number of nibbles of data present. The data fields include fixed data and variable data, thus there is typically a minimum number of data fields. Additionally, the data fields are randomized using a seed specified by the seed index. Also the CRC nibble is randomized together with the data nibbles.

Figure 5:
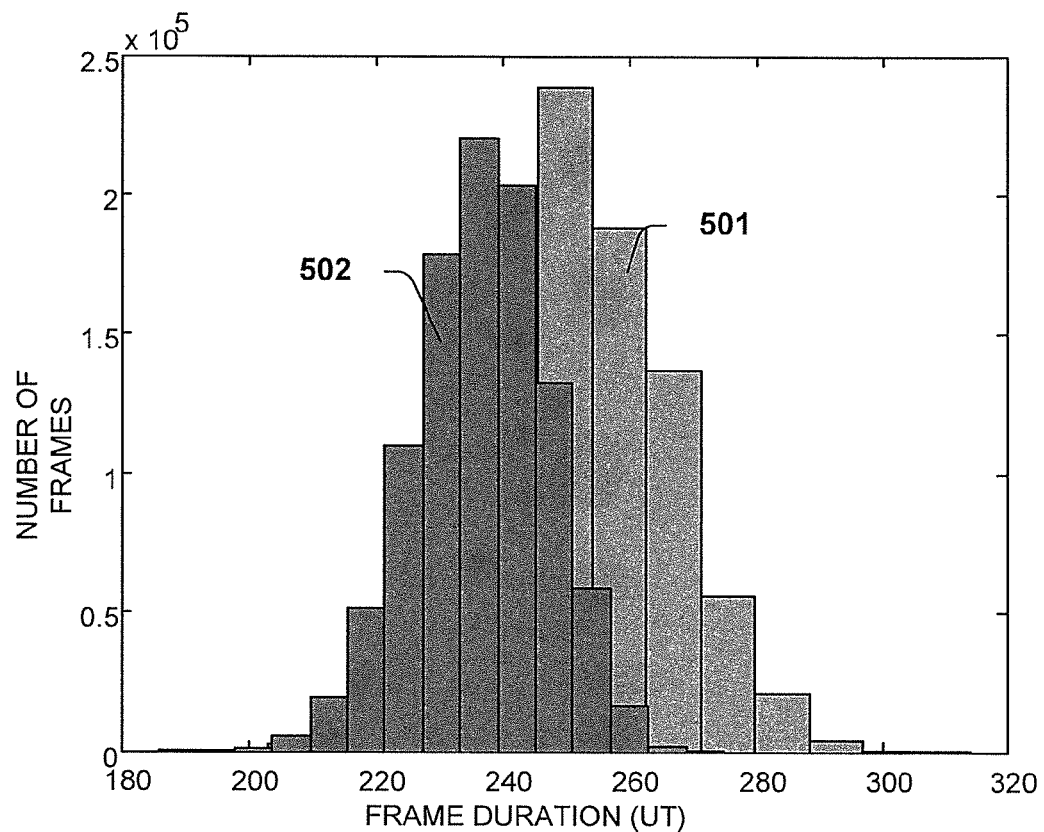
FIG. 5 is a graph illustrating example simulation of frames sent using randomized frames and non-randomized frames.

FIG. 5 is a graph 500 illustrating example simulation of frames sent using randomized frames and non randomized frames. The graph 500 is provided for illustrative purposes only. The graph 500 is obtained by simulating frames and randomized frames using a communication protocol, such as SPC or SENT. The simulation uses a frame having 2 bits for seed index and 10 nibbles.

An x axis specifies frame duration in unit time (UT) and a y-axis depicts number of frames. A first portion 501 is based on using a transmitter that does not employ randomization. Here it can be seen that a max frame duration of 315 UT is seen.

A second portion 502 is based on a randomizer transmitter, such as the randomizer transmitter 200, described above. An average frame duration is reduced by 5.4% and a maximum frame duration of about 275 UT is reduced by 12.42%.

Thus, the addition of 2 bits for the seed index results in a substantial reduction in average frame duration and an even more substantial reduction in maximum frame duration.

Figure 6:
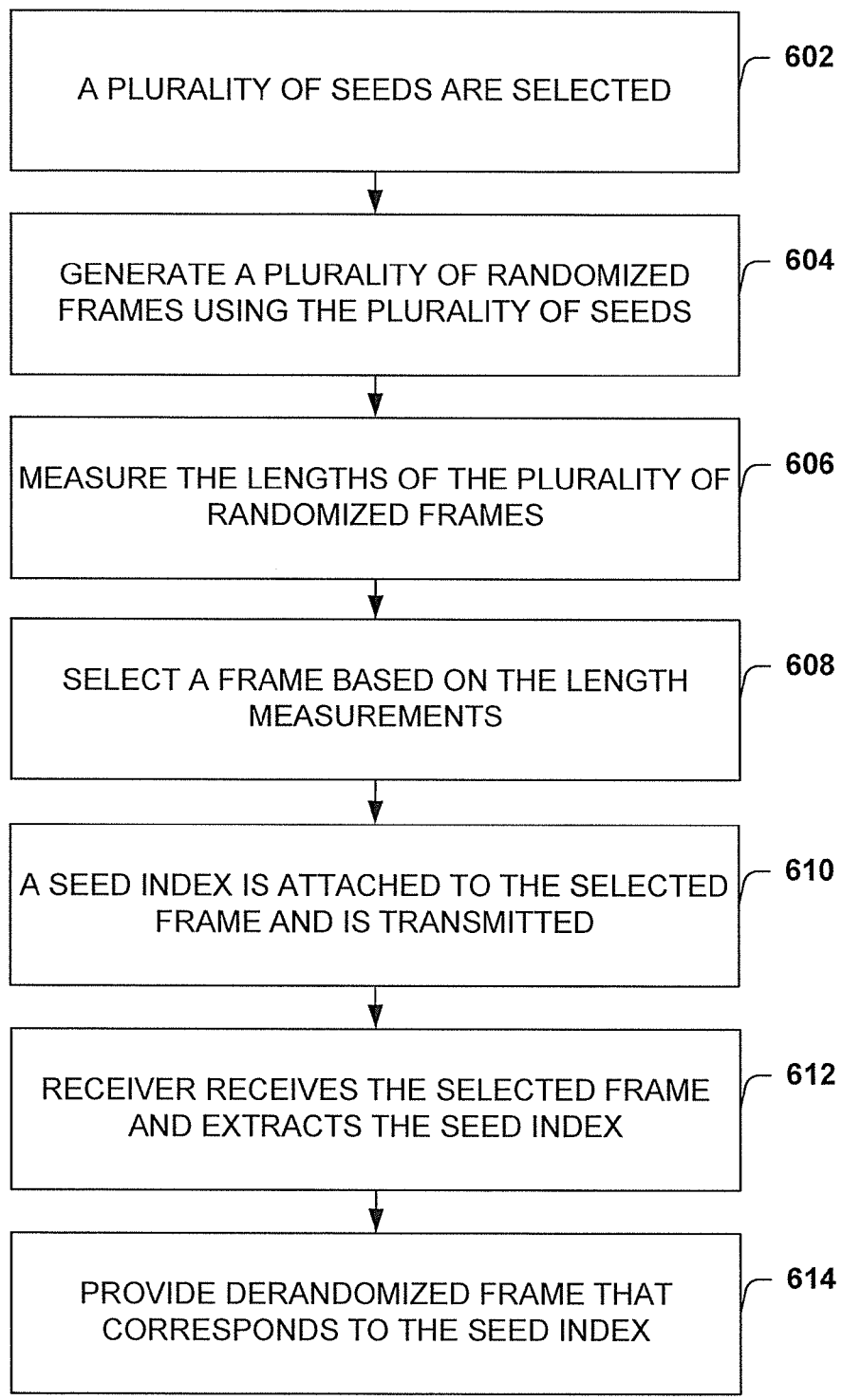
FIG. 6 is a flow diagram illustrating a method of transmitting frames with a reduced average duration.

FIG. 6 is a flow diagram illustrating a method 600 of transmitting frames with a reduced average duration. The method 600 randomizes frames and then identifies which frame has the lowest or shortest duration. Then, the identified frame is sent to a receiver, where the original frame is recreated. The method 600 can be performed with arrangements, systems and variations thereof described above.

A control unit selects a plurality of seeds at block 602. The control unit can include a processor and a memory and/or other circuitry. The number of the plurality of seeds is selected to mitigate the frame duration. It is appreciated that the more seeds that are used, the more bits that are required to specify an index to the used seed. In addition to selecting the seeds, the randomization technique is also selected. For example, an additive scrambling technique, pseudo randomization, multiplicative scrambling technique and/or the like can be selected.

In addition to the number of seeds, it is also appreciated that some seeds may work better than others. Thus, in one example, possible seeds are tested for reducing frame duration and the plurality of seeds selected at block 602 are those seeds that yield the lowest average duration. Such seed selection is typically done at system configuration and/or development. However, it is appreciated that a control unit or the like can be used to determine or update the seeds.

A plurality of randomized frames are generated from an original frame using the plurality of seeds at block 604. One or more randomizers, such as the randomizers 214, can be used to generate the randomized frames. The randomizers generally utilize a different seed of the plurality of seeds in order to generate each of the randomized frames. As a result, the plurality of randomized frames are typically varied from each other due to the randomization.

The plurality of randomized frames and the original frame are measured for duration at block 606. The duration in unit time can be generated, such as using the formula described above, to measure the duration of each of the frames. It is noted that some of the randomized frames can be longer than the original frame as the randomization does not always result in shorter frames. One or more measuring components can be used to perform the duration measurements.

It is also appreciated that other criteria in addition to or instead of duration can also be measured. For example, current levels, emissions, transitions and the like can be measured or otherwise obtained for the plurality of frames and the original frame.

A frame of the plurality of frames and the original frame is selected based on the duration measurements at block 608. Typically, the shortest or about the shortest frame is selected. Additionally, it is appreciated that the shortest frame may be the original frame. A frame select component, in one example, is used to select the frame from the plurality of frames and the original frame. In yet another example, the select frame is always one of the plurality of randomized frames.

It is also appreciated that the frame selection can depend on other criteria, as described above.

A seed index is attached to the selected frame and transmitted at block 610. The seed index references or identifies which of the plurality of seeds was used to generate the selected frame. Typically, a seed index of zero indicates that the original frame is sent as the selected frame. The control unit or frame select component can be used to attach the seed index.

The selected frame can be transmitted or sent using a variety of suitable techniques. In one example, the selected frame is sent using an RF signal. The selected frame can be additionally processed, including modulating, error checking and the like.

A receiver receives the selected frame at block 612 and extracts the seed index from the selected frame. The selected frame can be processed, such as being demodulated and the like. An extract seed component can be used to pull the seed index from a field of the selected frame. In one example, the seed component provides an output value that indicates which of the plurality of seeds was used to randomize the selected frame.

One or more derandomizers process the selected frame at block 614 and a descrambled or unrandomized frame corresponding to the seed index is provided. In one example, the one or more derandomizers use assigned seeds of the plurality of seeds to generate a plurality of unrandomized frames. Essentially, the derandomizers perform the reverse or inverse operation of the randomizers. Then, one of the plurality of unrandomized frames correlated to the extracted seed index is selected as the provided output frame. The output frame is typically substantially identical to the original frame. The output frame can then be used for its data and/or other applications.

In another example, a derandomizer is selected based on the seed index and is used to generate the output frame. In this example, there are a plurality of derandomizers where each has an assigned seed. In yet another example, the derandomizer is provided with a seed based on the seed index in order to generate the output frame. It is appreciated that other variations of generating the output frame are also contemplated.

The method 600 can be repeated for additional frames in order to provide additional transfer of information. It is appreciated that an average frame duration can be mitigated by using the above randomization techniques and selecting a frame having a shorter or shortest duration. As a result, throughput and the like can be increased.

While the methods provided herein are illustrated and described as a series of acts or events, the present disclosure is not limited by the illustrated ordering of such acts or events. For example, some acts may occur in different orders and/or concurrently with other acts or events apart from those illustrated and/or described herein. In addition, not all illustrated acts are required and the waveform shapes are merely illustrative and other waveforms may vary significantly from those illustrated. Further, one or more of the acts depicted herein may be carried out in one or more separate acts or phases.

It is noted that the claimed subject matter may be implemented as a method, apparatus, or article of manufacture using standard programming and/or engineering techniques to produce software, firmware, hardware, or any combination thereof to control a computer to implement the disclosed subject matter (e.g., the systems shown above, are non-limiting examples of circuits that may be used to implement disclosed methods and/or variations thereof). The term "article of manufacture" as used herein is intended to encompass a computer program accessible from any computer-readable device, carrier, or media. Those skilled in the art will recognize many modifications may be made to this configuration without departing from the scope or spirit of the disclosed subject matter.

Examples may include subject matter such as a method, means for performing acts or blocks of the method, at least one machine-readable medium including instructions that, when performed by a machine cause the machine to perform acts of the method or of an apparatus or system for concurrent communication according to examples described herein.

In one example, a transmitter arrangement using randomization is disclosed. The arrangement includes one or more randomizers, a measure component and a frame select component. The one or more randomizers are configured to generate one or more randomized frames from an original frame. The measure component is configured to measure a criterion for the original frame and the one or more randomized frames. The frame select component is configured to select a frame for transmission from the one or more randomized frames and the original frame. The selection is performed according to the measured criteria, such as frame duration.

In another example, a communication system is disclosed. The communication system includes a randomizer transmitter and a derandomizer receiver. The randomizer transmitter is configured to generate a plurality of randomized frames from an original frame, compare durations of the original frame and the plurality of randomized frames, select a frame for transmission based on the durations and append a seed index to the selected frame. The derandomizer receiver is configured to receive the selected frame, extract the seed index from the selected frame and descramble the selected frame using the seed index.

In another example, a method of transmitting frames is disclosed. A plurality of seeds are selected by a control unit. A plurality of randomized frames are generated from an original frame using the plurality of seeds. One of the plurality of randomized frames is selected for transmission based on frame duration.

Although the invention has been illustrated and described with respect to one or more implementations, alterations and/or modifications may be made to the illustrated examples without departing from the spirit and scope of the appended claims. For example, although a transmission circuit/system described herein may have been illustrated as a transmitter circuit, one of ordinary skill in the art will appreciate that the invention provided herein may be applied to transceiver circuits as well.

Furthermore, in particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. The component or structure includes a processor executing instructions in order to perform at least portions of the various functions. In addition, while a particular feature of the invention may have been disclosed with respect to only one of several implementations, such feature may be combined with one or more other features of the other implementations as may be desired and advantageous for any given or particular application.

Furthermore, to the extent that the terms "including", "includes", "having", "has", "with", or variants thereof are used in either the detailed description and the claims, such terms are intended to be inclusive in a manner similar to the term "comprising".

What is claimed is:

1. A transmitter arrangement using randomization comprising:
   one or more randomizers configured to generate one or more randomized frames from an original frame;
   a measure component configured to measure a criterion for the original frame and the one or more randomized frames; and
   a frame select component configured to select a frame for transmission from the one or more randomized frames and the original frame according to the measured criterion.

2. The arrangement of claim 1, wherein the criterion is frame duration.

3. The arrangement of claim 1, wherein the criterion is current consumption.

4. The arrangement of claim 1, wherein the one or more randomizers are assigned one or more unique seeds to generate the one or more randomized frames.

5. The arrangement of claim 1, wherein the original frame has a greater duration than at least one of the one or more randomized frames.

6. The arrangement of claim 1, wherein the selected frame for transmission includes a seed index field configured to identify a seed used.

7. The arrangement of claim 1, wherein the one or more randomizers comprise linear shift registers.

8. The arrangement of claim 1, wherein the one or more randomizers include at least one of an additive randomizer and a multiplicative randomizer.

9. The arrangement of claim 1, wherein the criterion is frame duration and the frame select component is configured to compare frame durations of the original frame and the one or more randomized frames.

10. The arrangement of claim 1, further comprising a data source to generate the original frame.

11. The arrangement of claim 1, wherein the selected frame for transmission includes an unrandomized portion, which includes a seed index.

12. The arrangement of claim 1, further comprising a receiver configured to receive the selected frame and to generate an output frame by unrandomizing the selected frame.

* * * * *